United States Patent [19]

Nineuil et al.

[11] Patent Number: 4,857,211

[45] Date of Patent: Aug. 15, 1989

[54] CLEANING OF FILTER SURFACES

[75] Inventors: Guy Nineuil, Bihorel; Louis Rivoirard, Saint-Etienne, both of France

[73] Assignee: Rhone-Poulenc Chimie, Courbevoie, France

[21] Appl. No.: 46,715

[22] Filed: May 7, 1987

[30] Foreign Application Priority Data

May 7, 1986 [FR] France .............................. 86/06612

[51] Int. Cl.$^4$ .............................................. B01D 41/00
[52] U.S. Cl. ...................................... 210/797; 134/3; 134/34; 423/321 R
[58] Field of Search ............... 210/797, 772, 791, 768, 210/696, 769; 423/321 R, 167; 134/3, 41, 28, 2, 40, 42, 34

[56] References Cited

U.S. PATENT DOCUMENTS

| | | | |
|---|---|---|---|
| 2,141,773 | 12/1938 | Strathmeyer | 423/343 |
| 2,937,069 | 5/1960 | Zoellner | 210/768 |
| 3,505,013 | 4/1970 | Kazuo Araki et al. | 423/167 |
| 3,521,751 | 7/1970 | Holthuis | 210/797 |
| 3,525,349 | 8/1970 | Scott | 210/696 |
| 4,101,638 | 7/1978 | Inoue et al. | 423/167 |
| 4,231,870 | 11/1980 | Fladby | 210/797 |
| 4,313,919 | 2/1982 | Richards et al. | 423/321 R |
| 4,443,421 | 4/1984 | Hollifield et al. | 210/791 |
| 4,557,915 | 12/1985 | Nineuil | 423/320 |
| 4,692,252 | 9/1987 | Atwood et al. | 134/41 |

OTHER PUBLICATIONS

Chemical Abstracts, vol. 86, No. 26, Jun. 27, 1977, p. 109, No. 191967d, & SU-A-551 248 (Lensovet Technological Institute, Leningrad; Leningrad State Scientific-Research Institute of the Basic Chemical Industry) 3/25/77.

*Primary Examiner*—Peter Hruskoci
*Assistant Examiner*—Coreen Y. Lee
*Attorney, Agent, or Firm*—Burns, Doane, Swecker & Mathis

[57] ABSTRACT

Encrusted filter surfaces that have been used for filtering wet process phosphoric acid slurries are effectively cleaned, e.g., of crystalline deposits, by washing same with a solution of fluosilic acid.

15 Claims, No Drawings

CLEANING OF FILTER SURFACES

BACKROUND OF THE INVENTION

1. Field of the Invention

The present invention relates to the cleansing of filter surfaces, and, more especially, to the cleansing of those filter surfaces used for the filtration of slurries resulting from the production of wet process phosphoric acid.

2. Description of the Prior Art

It is known to this art to produce phosphoric acid by the wet process, acid decomposition (typically using sulfuric acid) of phosphate rock. In such process a slurry is obtained which, after filtering, yields a more or less concentrated phosphoric acid, on the one hand, and a solid filter cake on the other. This solid filter cake, depending upon the particular operating conditions, consists essentially or principally of either gypsum (calcium sulfate dihydrate) or plaster (calcium sulfate hemihydrate).

Such solid filter cake is removed from the filter, for the most part by any suitable mechanical means, with the remaining fraction being eliminated from the filter surface, typically by washing with hot water.

It has now been determined that this stage of cleaning of the filter surface is insufficient to eliminate all of the crystalline formations encrusting the filter surface.

The presence of this encrustation gives rise, on the one hand, to a progressive reduction in the general porosity of the filter surface and thus the washing yield, and on the other hand to a considerable limitation of the life of said filter surface.

This adversely affects the profitability of the production process, both relative to the financial cost of replacing the filter surface itself, as well as in the time required to replace the latter, during which the production process is necessarily interrupted.

SUMMARY OF THE INVENTION

Accordingly, a major object of the present invention is the provision of an improved continuous process for the cleansing of filter surfaces used for the filtering of slurries resulting from the production of wet process phosphoric acid, and which improved continuous process permits effective removal of the encrustation of said surfaces and significantly extends the useful life thereof.

Briefly, the present invention features the washing of such encrusted filter surfaces with a solution of fluosilicic acid.

DETAILED DESCRIPTION OF THE PREFERRED EMBODIMENTS OF THE INVENTION

More particularly according to the present invention, it has now unexpectedly been discovered that washing encrusted filter surfaces with fluosilicic acid obviates the disadvantages of the cleaning processes of the prior art. In addition, also quite unexpectedly and surprisingly, the major part of the crystalline deposits encrusting the face surfaces of filters used for phosphoric slurries is effectively removed. The advantages thus realized are extended life of the filtering surfaces and a constant porosity thereof over time.

The present invention is applicable to all types and kinds of filters known to this art for the filtering of a phosphoric slurry. The filter thus may be, in particular, of a type comprising a simple metal screen as the filtering surface, or of the type comprising a metal screen upon which a filter cloth is placed, said fabric generally being polypropylene or polyester, or, finally, of a type comprising an intermediate cloth substrate disposed between the metal screen and the aforementioned filter cloth.

This invention is especially well adapted for washing filters of the second category.

Exemplary of the filters presently used in the production of wet process phosphoric acid, representative are those described in published French Application No. 2,552,526, assigned to the assignee hereof.

The phosphoric slurries poured onto the filter are those produced by the conventional acid attack of phosphate rock, such acid typically being sulfuric acid or hydrochloric acid.

It is also possible to effect the decomposition of the rock using a mixture of phosphoric acid and fluosilicic acid, such as described in published French Application No. 2,548,653.

In a preferred embodiment of the invention, the slurries treated are those emanating from sulfuric acid attack of the mineral, i.e., slurries produced after filtering a solid filter cake consisting essentially of calcium sulfate.

Following operational parameters well known to those skilled in this art, such calcium sulfate may be in the form either of gypsum (dihydrate process) or plaster (hemihydrate process).

In another preferred embodiment of the invention, solid filter cakes of calcium sulfate dihydrate are used.

The cake formed over the course of the filtration is then removed from the filter, at least in principal part, by any appropriate mechanical means, in particular by dumping the cake or removing same using an endless screw.

In a preferred and industrial embodiment of the invention, the subject washing operation is conducted on a surface previously cleaned as indicated above. However, it too is possible to carry out the washing process on a filter surface still bearing the filter cake.

The washing of the filter surface is carried out by contacting it with a solution of fluosilicic acid. This solution should consist essentially of $H_2SiF_6$ acid and be free, in particular, of impurities of the type of $P_2O_5$, calcium, sulfates, fluosilicates, and the like.

Such contacting may be carried out in any manner per se known and is not a critical parameter of the present invention.

In another preferred embodiment, the contacting is carried out by spraying the acid solution by means of conventional spray nozzles, with the efficiency of the washing process being a function of the spraying pressure. Exemplary of such embodiment, a pressure of from 3 to 12 bars is advantageously used.

The concentration of the fluosilicic acid according to the present invention advantageously ranges from 0.5 to 5% by weight, but it is possible to operate outside of this range, but with reduced efficiency.

Concentrations more particularly ranging from 1 to 2% by weight of fluosilicic acid are preferably used.

In an even more preferred embodiment of the invention, best results are obtained using concentrations of from 1 to 1.5% by weight of the acid.

During the contacting of the filter surface, the temperature of the acid solution typically ranges from 70° to 90° C.

In a preferred embodiment of the invention, the optimum temperature is about 80° C.

The fluosilicic acid solution used in the present invention may be produced by any known process, in particular by the hydrolysis of tetrafluorosilane in water, in the desired proportions.

In yet another preferred embodiment of the invention, the fluosilicic acid solution is produced by the absorption, in water, of those gases evolved during the subsequent concentration of the product phosphoric acid, after filtration. This process constitutes a particularly economical and facile means to prepare the desired $H_2SiF_6$ acid solution, in light of the fact that the concentration of phosphoric acid after filtering is, in general, a later stage in the production process, particularly in the case of the dihydrate process.

Concerning the heating of the acid wash solution to the desired temperature, an especially economical embodiment includes preheating the solution by contacting it, in wash towers, with the gases evolved during the acid decomposition of the phosphate rock.

The additional heat potentially required is provided by a conventional heating system.

Thus, it has now been found that the process of the present invention enables use of filter cloths for one month or even longer, depending upon their mechanical strength, while according to the prior art the average life of filter cloths did not exceed a few days, particularly if silicic phosphate minerals are processed.

In order to further illustrate the present invention and the advantages thereof, the following specific example is given, it being understood that same is intended only as illustrative and in nowise limitative.

EXAMPLE

A Taiba phosphate rock was decomposed with sulfuric acid using the dihydrate process. The slurry produced was filtered on a filter of UCEGO type having the following characteristics:

(a) Filtering surface area: 160 m$^2$
(b) Nature of the filter cloth: polypropylene
(c) Porosity in new condition: 7,500 m$^3$ air/hour/m$^2$ of cloth (measured under 20 mm column of water).

This slurry consisted of 30% by weight phosphoric acid, expressed as $P_2kO_5$, and 35% by weight solids.

The temperature of the slurry was then 80° C.

The filter cake was subsequently removed using an endless screw.

In the case of conventional washing with water at 60° and a flow rate of 100 m$^3$/h, after a week of use a porosity of 300 m$^3$/h/m$^2$ of the filter cloth was measured.

This value was incompatible with efficient industrial operation of the installation and, in particular, the wash yield became unacceptable. In the event of a wash according to the invention, using a 1% by weight $H_2SiF_6$ acid solution, a flow rate of 100 m$^3$/h and at a temperature of 80° C., it was determined that after six weeks the porosity of the cloth was essentially unchanged and was on the order of 6,000 m$^3$/h/m$^2$. Only mechanical strength problems made its replacement necessary.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the cleaning of a filter surface that has been used for the filtration of a wet process phosphoric acid slurry, comprising washing said filter surface with a solution consisting essentially of fluosilicic acid, wherein said filter surface has been preliminarily mechanically stripped of the solid filter cake formed thereon the preliminarily stripped filter surface bearing encrusted deposits of crystalline solids which are removed by said solution.

2. The process as defined by claim 1, the washing comprising spraying the solution of fluosilicic acid onto said filter surface under pressure.

3. The process as defined by claim 1, said solution of fluosilicic acid having a concentration of from 0.5 to 5% by weight.

4. The process as defined by claim 1, said solution of fluosilicic acid having a concentration of from 1 to 2% by weight.

5. The process as defined by claim 1, said solution of fluosilicic acid having a concentration of from 1 to 1.5% by weight.

6. The process as defined by claim 3, the temperature of said solution of fluosilicic acid ranging from 70° to 90° C.

7. The process as defined by claim 3, the temperature of said solution of fluosilicic acid being about 80° C.

8. The process as defined by claim 1, said phosphoric acid slurry comprising gypsum.

9. The process as defined by claim 1, said phosphoric acid slurry comprising plaster.

10. The process as defined by claim 1, said phosphoric acid slurry produced by sulfuric acidulation of phosphate rock.

11. The process as defined by claim 1, comprising preheating said solution of fluosilicic acid by contacting same with gases evolved during the wet process production of said phosphoric acid slurry.

12. The process as defined by claim 1, said solution of fluosilicic acid having been produced by absorbing, in water, gases evolved upon concentration of filtered phosphoric acid.

13. The process as defined by claim 1, said filter surface comprising a metal screen.

14. The process as defined by claim 15, said metal screen having a filter cloth disposed thereon.

15. The process as defined by claim 1, said phosphoric acid slurry comprising calcium sulfate.

* * * * *